Figure 6:
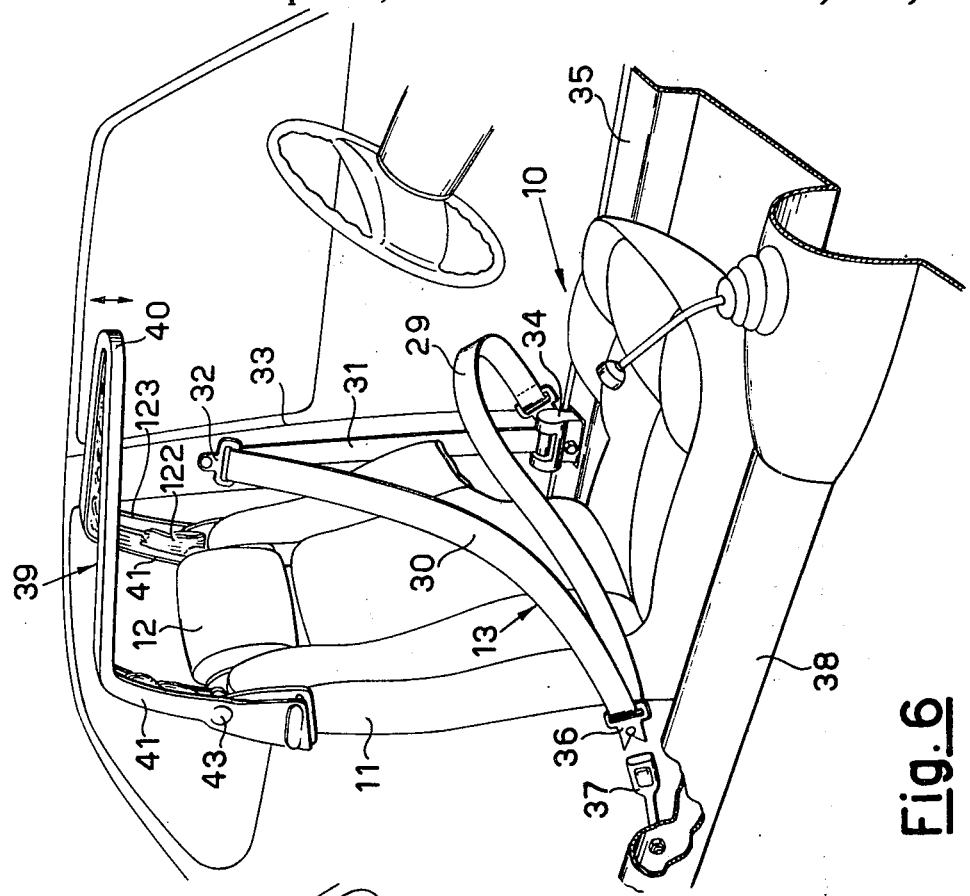

United States Patent [19]

Surace et al.

[11] 3,953,049
[45] Apr. 27, 1976

[54] INFLATABLE HEAD PROTECTOR

[75] Inventors: Filippo Surace, Milan; Marco Garetti, Mariano Comense (Como), both of Italy

[73] Assignee: Alfa Romeo S.p.A., Milan, Italy

[22] Filed: Mar. 7, 1974

[21] Appl. No.: 449,211

[30] Foreign Application Priority Data
Mar. 8, 1973  Italy .................................. 21333/73

[52] U.S. Cl. .............................. 280/730; 280/733; 280/749
[51] Int. Cl.² ........................................ B60R 21/08
[58] Field of Search .... 280/150 AB, 150 B, 150 SB; 297/390

[56]  References Cited
UNITED STATES PATENTS

| | | | |
|---|---|---|---|
| 3,077,355 | 2/1963 | Santesso | 280/150 AB |
| 3,133,746 | 5/1964 | Zazzara | 280/150 B |
| 3,262,716 | 7/1966 | Graham | 280/150 B |
| 3,588,142 | 6/1971 | Gorman | 280/150 AB |
| 3,650,542 | 3/1972 | Shimano | 280/150 B |
| 3,692,327 | 9/1972 | Barrick | 280/150 B |
| 3,713,695 | 1/1973 | Wimmersperg | 280/150 B X |
| 3,722,951 | 3/1973 | Ezquerra | 280/150 SB X |
| 3,753,576 | 8/1973 | Gorman | 280/150 AB |
| 3,774,937 | 11/1973 | Otani | 280/150 B X |
| 3,795,412 | 3/1974 | John | 280/150 AB |
| 3,827,716 | 8/1974 | Vaughn | 280/150 AB |
| 3,836,168 | 9/1974 | Nonaka et al. | 280/150 AB |
| 3,837,670 | 9/1974 | Hilyard | 280/150 B |

*Primary Examiner*—Philip Goodman
*Assistant Examiner*—John P. Silverstrim
*Attorney, Agent, or Firm*—Haseltine, Lake & Waters

[57] ABSTRACT

A safety device for motor car passengers adapted for protecting the passenger's head in the case of collision. The safety device comprises a protective strip which unfolds itself in a spatial form generated by rotation of a U-shaped line about an axis passing through the ends of the U-shaped line. The axis is horizontal and transverse with respect to the vehicle and is at the level of the head, behind the latter. At the instant of impact, the strap is inflated by a pressurized gas and is unfolded so as to become positioned in front of the passenger's head to protect the same.

12 Claims, 11 Drawing Figures

INFLATABLE HEAD PROTECTOR

This invention relates to a device which is adapted to protect the passenger's head is a motor vehicle in the case of impact, especially front collision.

A number of devices have been suggested heretofore to prevent or at least to reduce the damages ensuing to the passengers of a motor vehicle in the case of an accident: they include devices of different kinds, such as padding the vehicle interior, pneumatic cushions which automatically inflate at the time of impact, seat belts permanently in position, in the sense that after the initial fastening operation they remain in active position as long as the passengers are in the interior of the vehicle.

Such devices are also used in combination, when devices of a single type do not solve the problem of passenger protection in a satisfactory manner. For example the seat belt devices have the advantage of not being as bulky as padding while simultaneously providing the passenger's safety in the vehicle; they require only the initial (manual) fastening operation and there is no risk of failure as, conversely, may happen with pneumatic cushions in the case of defects in the inflation apparatus, but they offer a protection which is limited only to a few parts of the passenger's body, and, in the majority of the cases, the head, in particular, is excluded from the protection.

Statistical findings on accidents and laboratory tests carried out to simulate the accidents, have shown that seat belts, for example, lap and shoulder belts, afford good protection until the velocity at impact is not too high; if, conversely, the velocity is high, while his passenger's body is firmly held on the seat, the head is subjected to a movement which is neither controlled nor braked and which causes stresses on the head which are above the tolerability threshold. For these reasons, there has been conceived a protection system which is based on the use of safety belts capable of protecting in the case of impact, the passenger's body, more particularly the trunk, and a device, cooperating with the belts, and especially provided for the protection of the head; field tests have confirmed that the device is acceptable from all points of view, especially as regards its efficiency, its size and the cost which, in mass production, requires to be limited.

The device comprises a protective strip which is essentially developed according to a spatial surface, such as that generated by a line having a substantial U-shape which is rotated about an axis passing through the two ends of said line, said axis being horizontal and extending in a direction which is transverse with respect to the vehicle and being arranged in a position which is behind the head, the strip being fastened to a structure which is integral with the vehicle at two points situated on said axis on opposite sides of the head: at the instant of impact the inertial forces from the contact of the passenger's head with the strip produce on the lateral sectors of the strip tensile stresses which are directed towards said axis, the line of action of the resultant of these tensile stresses having an extremely reduced distance, preferably nil, from the center of gravity of the passenger's head, the strip having appropriate characteristics of deformability, such that in the normal conditions of use of the vehicle the entire strip is contained, for example bent over itself, in a light casing of a reduced volume which is substantially in the shape of a U and, at the instant of impact the strip is arranged along the aforesaid spatial surface in order to provide its protective action, at the first deceleration of the motor vehicle having a magnitude exceeding a preselected value, means sensitive to said deceleration determining the release of the strip from said casing and an extremely rapid transition from the normal configuration characterized by a reduced volume to the useful configuration which is completely unfolded to afford the protective action for the passenger's head.

Features and advantages of the invention will become further evident from the detailed description of the accompanying drawings, wherein several embodiments of the device are shown by way of nonlimiting example.

Figure 1:
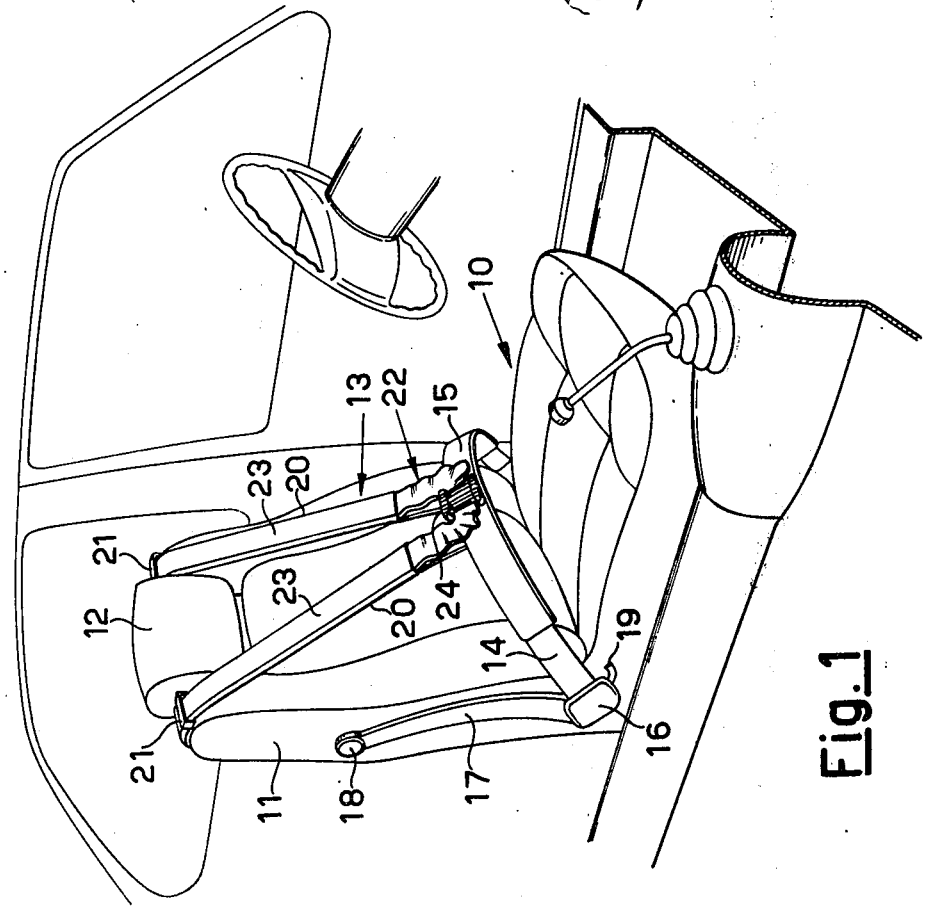

FIG. 1 shows a perspective view of a first embodiment of a device according to the invention.

Figure 2:
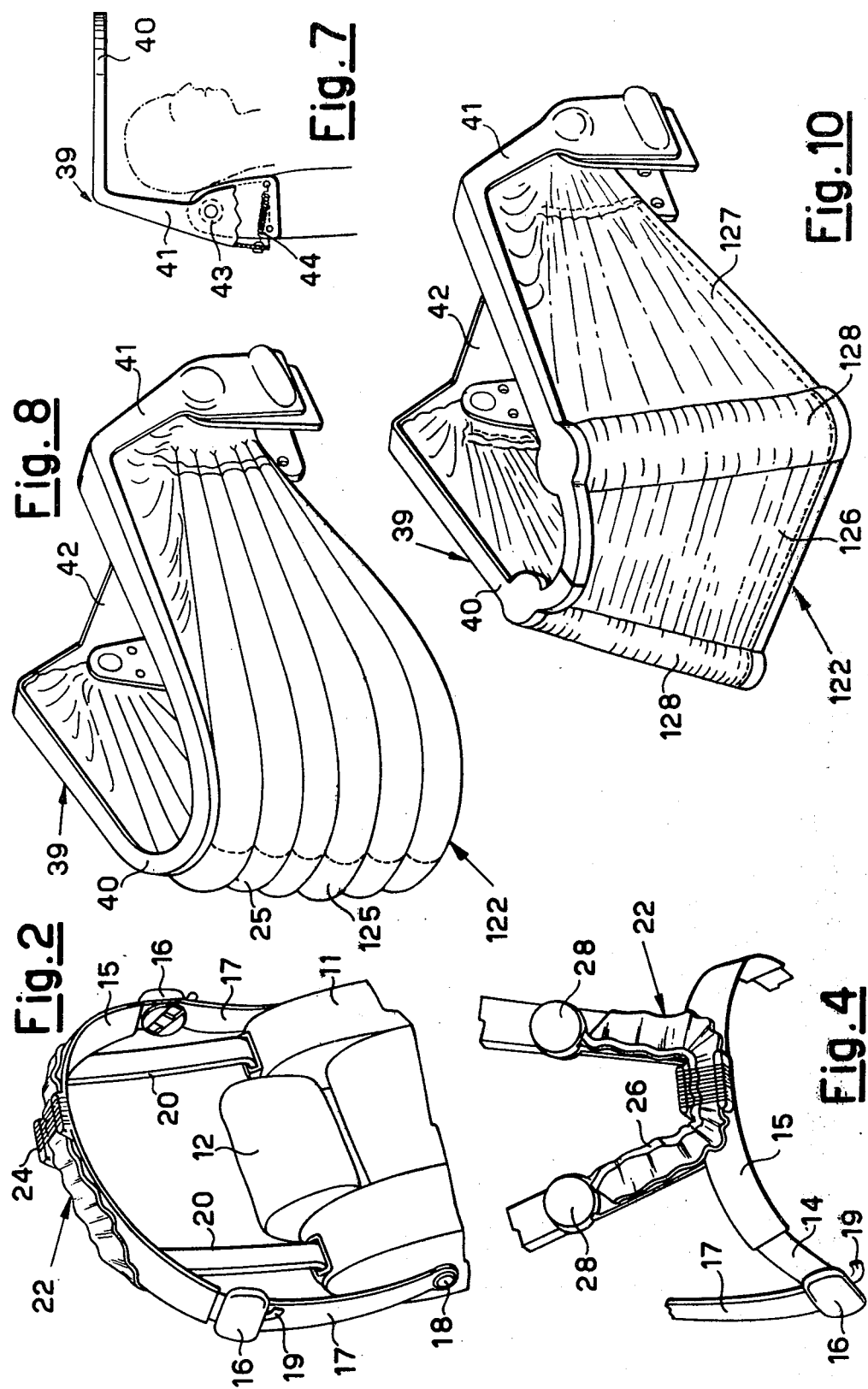
Figure 3:
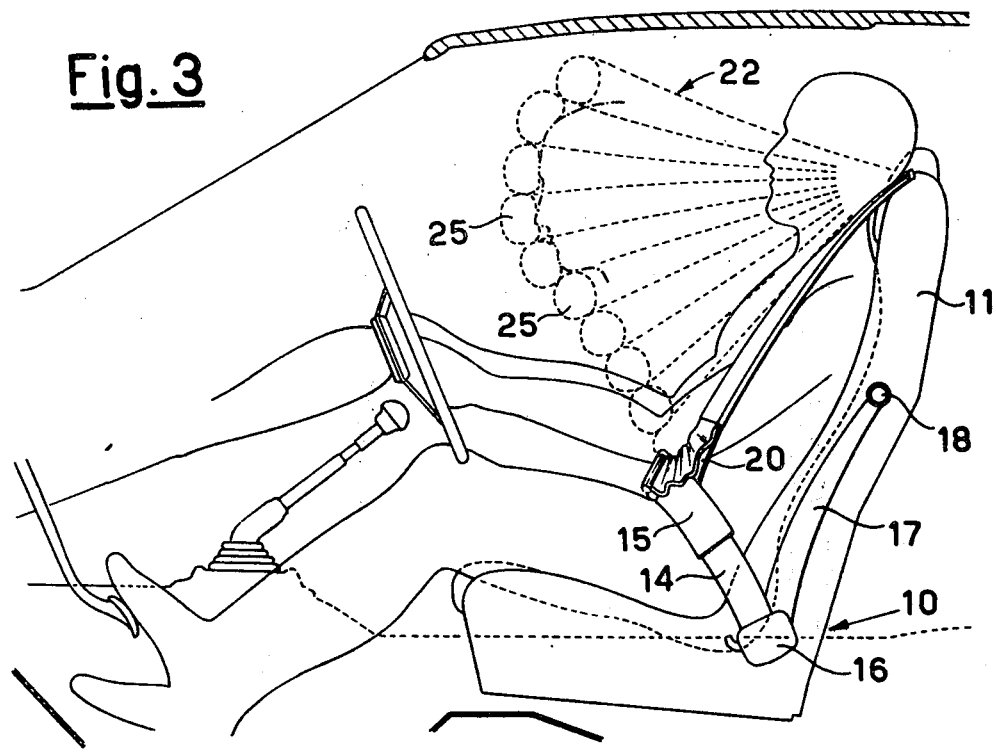

FIGS. 2, and 3 are further views of the embodiment of FIG. 1.

Figure 5:
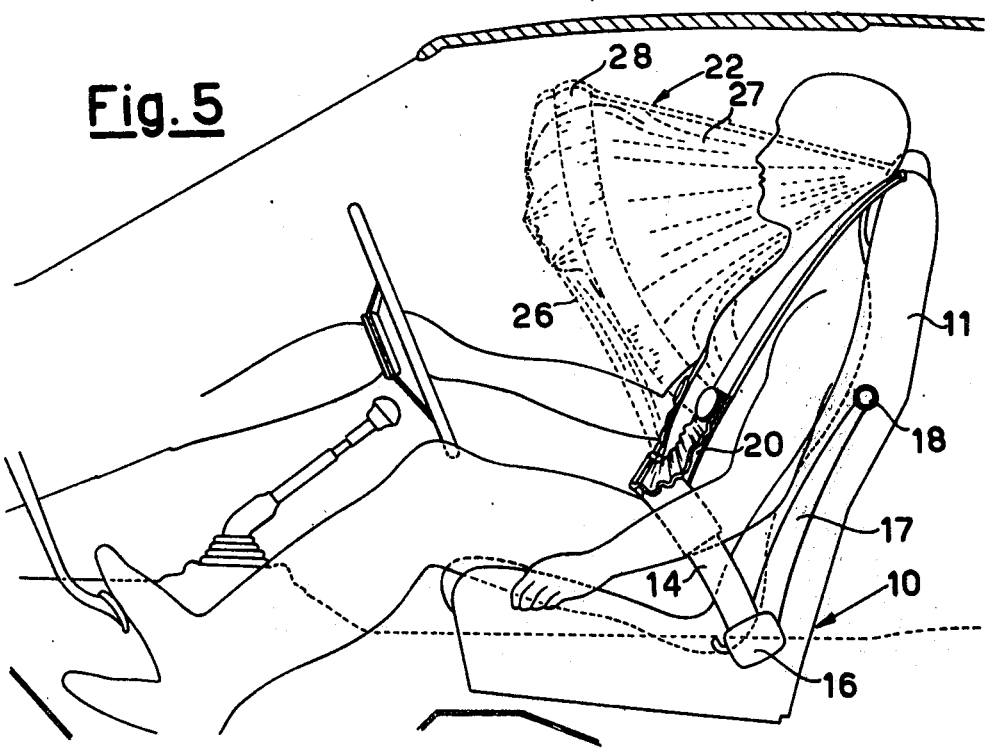

FIGS. 4, 5 show views of a second embodiment of the invention.

FIGS. from 6 to 9 show views of a third embodiment of the invention.

Figure 11:
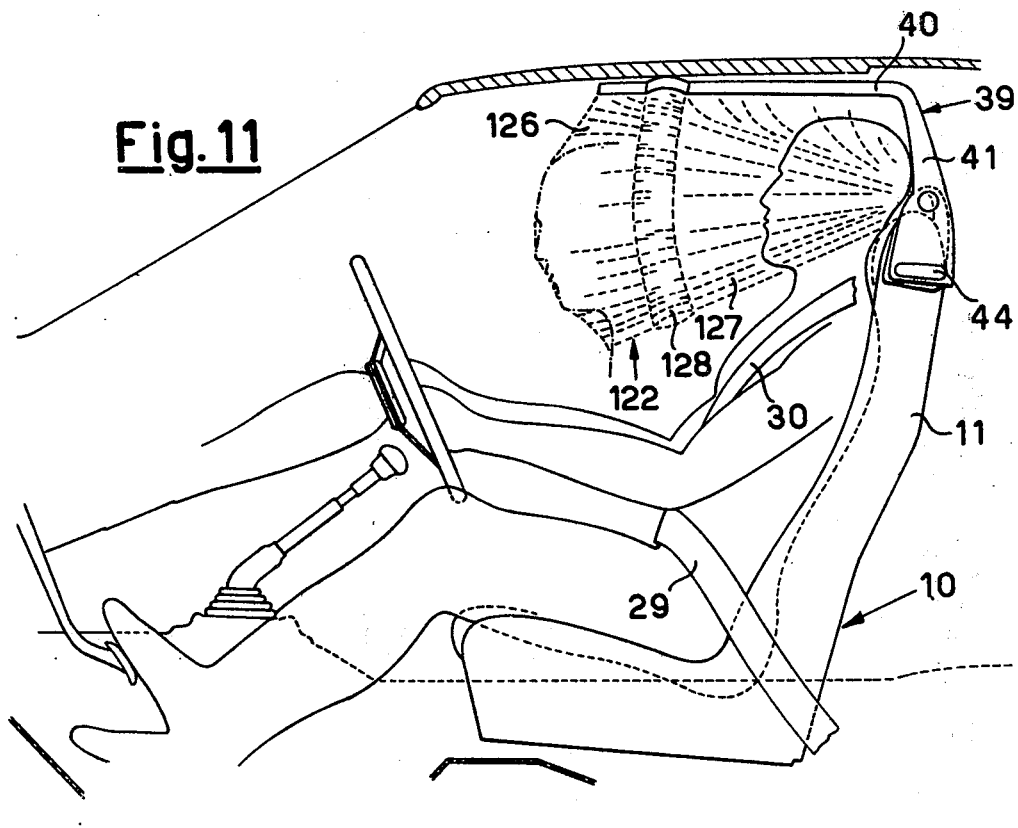

FIGS. 10, and 11 show views of a fourth embodiment similar to those shown in FIGS. 6 to 9.

In FIG. 1 there is partly shown the interior of a motor vehicle at the driver's side. There is shown at 10 the seat and there is indicated at 12 the head rest incorporated in the back 11. The seat is equipped with seat belts generally shown at 13 (belts of this kind are shown for example in Italian Pat. No. 932,312 in the name of the same applicants hereof). There are indicated at 14 the lap belt and at 20 the two suspender-like shoulder belts. The belt 14 is connected by inertia recoil members 16 to arms 17 (one is shown in the drawings) pivoted at 18 to the back 11 and movable on the flanks of the back from the lifted position of FIG. 2, where they are recalled by resilient means (not shown), to the lowered position of FIG. 1 where they are held by hooks 19. The suspender-like belts 20 are guided at 21 in their sliding movements and are connected to the back by inertia recoil means. A mechanism in the inside of the sheath 15 of the belt 14 allows the belts 20 to pass from the spread out position of FIG. 2 to the retracted position of FIG. 1, while the arms 17 are lowered by the person occupying the seat 10 to bring the belts 13 in the operative position.

The device for protecting the passenger's head is formed by a strip 22 of an appropriate form which at the instant of use encompasses the head to prevent forward uncontrolled motion thereof. The strip is shown in FIGS. 1 and 2 in the inoperative condition, folded over itself and held against the belts 20 by thin sheaths 23, the strip 22 being connected to the sheath 15 of the belt 14 by a light strap 24. Its ends are affixed at 21 to the upper edge of the back 11 (they could also be connected to the head rest 12). The strip comprises inflatable members connected by valve means which are actuated by shock feelers (not shown since they are conventional) to a source of pressurized gas.

At the instant impact, especially front impact, if the deceleration exceeds the threshold limit of the feelers, pressurized gas flows towards the inflatable members of the strip 22; since the final volume of strip 22 is not great, the inflatable members thereof are inflated rapidly and break the sheaths 23 and the strap 24. The strip is lifted so as to be brought in front of the passenger's head in the configuration of use, along a spatial surface which can be considered as being substantially generated by the rotation of a U-shaped line about an axis which passes through points 21 where the strip is fastened to the back 11. In FIG. 3 the strip is shown in the operative configuration in dotted lines; in the particular case the strip is formed by a plurality of superimposed inflatable members 25, of a tubular form arranged in a direction which is substantially transverse with respect to the motor vehicle. The tubular members 25 have a cross-section which is tapered towards the ends in correspondence with the points 21 where they are fastened to the seat back.

The materials as employed for manufacturing the device should have appropriate characteristics of deformability under load so as to ensure a correct check of the passenger's head in its forward motion. It is appropriate, in fact, that the head be braked within not too short distance, nor too great a distance, and specifically as a function of the displacement of the thorax as allowed by the belts, so as not to induce injurious stresses on the head. In addition, it is necessary that a considerable fraction of the energy of deformation of the strip, due to the effect of the loads deriving from the shock, not be absorbed elastically, but dissipated so as not to be reconstituted in mechanical form to prevent recoil and impact of the head. The same result can be obtained with a strip of a material having considerable stiffness and connecting the strip to the seat by suitable energy absorbers.

One of the most beneficial features of the device of the invention is that it avoids the occurrence in the passenger's head of further injurious flexural stresses which would be added to the inertial stresses deriving from the contact of the passenger's head with the strip. The positioning of the points 21 where the strip is fastened to the back is defined by the design so that the tensile forces produced on the lateral sectors of the strip by the inertial forces generated by the impact between the head and the strip have a resultant passing substantially through the centre of gravity of the head.

In FIGS. 4 and 5 there is shown a possible modification of the strip of FIG. 3. In this case the strip has in the configuration shown in FIG. 5 a slightly different shape: it is formed by a central canvas member 26 connected to canvass side sectors 27 by two inflatable members 28 of a tubular shape having a substantially vertical disposition. The arrangement and the operation of a strip of this kind are similar to those of the strip in FIGS. 1–3. The strip 22 can be made of an opaque material, but preferably a transparent material is used.

FIG. 6 shows a constructional modification of the device for protecting the passenger's head; this device is particularly suitable for use with seat belts other than those shown in the preceding Figures.

In this modification the seat 10 has seat belts formed by a lap belt 29 and a shoulder belt 30 for the thorax, connected by the vertical portion 31. The belt assembly is connected by connection ring 32 to upright 33, by inertia recovery device 34 to beam 35 and by additional connection ring 37 to the tunnel 38 of the vehicle. At the top portion of the back there is fastened a light weight frame which serves as the supporting member for the strip; the frame is formed by a rod 40 in the shape of a U which is extended by two arms 41 connected by a plate 42 and pivoted at 43 to the back 11 of the seat. The frame is held positioned with respect to the back by springs 44 affixed to the arms 41 and to the back as shown in FIG. 7. In the normal conditions of use of the vehicle, the head protecting strip 122 is held folded over itself against the rod 40 and the arms 41 by specially provided sheaths 123 and a light central strap (not shown). The ends of the casing of the strip 122 are affixed near the pivots 43 to the upper edge of the back. In this embodiments the strip also comprises inflatable members connected by valve means actuated by shock feelers to a source of pressurized gas.

At the instant of impact, the inflatable members of the strip 122 are inflated due to the inflow of pressurized gas by breaking the sheaths 123 and the central strap. The strip is lowered to a position in front of the passenger's head, this being its operative configuration: the forward movement of the head is restrained and controlled due to the action of the strip 122 which behaves like the strip 22 of the embodiment described hereinbefore.

Figure 9:
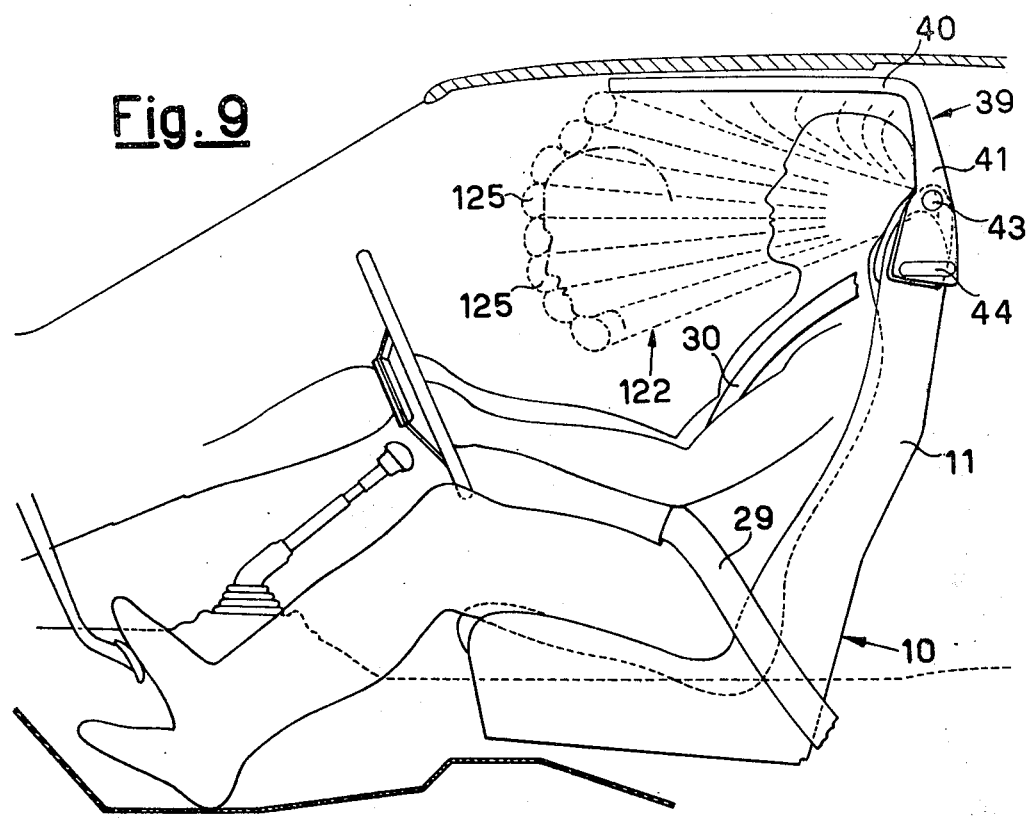

The form and the useful configuration of the strip 122 can be as shown in FIGS. 8 and 9 in which the strip 122 is formed by a plurality of superposed inflatable members of tubular form, arranged in a direction substantially transversal with respect to the vehicle. In FIGS. 10 and 11 the strip 122 is formed by a central canvas 126 connected to lateral canvas sectors 127 by two substantially vertical inflatable members 128 of tubular form.

With the arrangement shown, the frame 39, together with the strip 122, is always kept united with the back 11 and the seat even when the back is inclined or the seat is displaced, additionally even though the frame 39 is arranged adjacent the headliner of the passenger compartment, it does not interfere with adjustment of the seat position.

When the shape of the joint makes the aforesaid arrangement difficult, the device can be housed in a casing fixed to the inner roof of the vehicle and the strip can be anchored to the roof at two points selected according to the aforesaid criteria, i.e. minimizing the distance between the barycenter of the head and the straight line of the resultant of the forces caused by contact of the strip and the head.

What is claimed is:

1. A device for the protection of the head on an occupant in a motor vehicle in the case of impact forces on the vehicle, said device comprising a protective strip having an extended operative position and a retracted inoperative position, said strip including a plurality of inflatable members, a casing retaining said strip folded on itself in said retracted position, said strip in said inoperative position extending along a substantially U-shaped line and having opposite ends with means attaching said ends to a structure which is integral with the vehicle at two points situated on a horizontal axis extending transversely of the vehicle at a position behind and on opposite sides of the head of an occupant seated in said vehicle for unfurling said strip in its operative position to extend essentially along a surface generated by rotation of said U-shaped line around said axis, said inflatable members of the strip including lateral sectors which in operative inflated position are disposed in front of the head of the occupant to be contacted thereby and produce tensile stresses in said sectors passing substantially through said axis, the line of action of the resultant of said tensile stresses substantially coinciding with the center of gravity of the occupant's head, and means responsive to a preselected deceleration magnitude of the vehicle for inflating said inflatable members to expel said strip from said folded inoperative position in said casing to said unfurled operative position, said inflatable members during inflation undergoing rapid transition to the inflated condition while the strip is restrained at said ends.

2. A device according to claim 1 wherein the vehicle includes a seat for the occupant, said structure being integral with the back of said seat, said seat being displaceable in said vehicle.

3. A device according to claim 1 wherein said casing includes a portion arranged essentially in a plane passing through said axis and inclined downwards.

4. A device according to claim 3 wherein the vehicle includes a seat for the occupant and seat belts having a lap belt and shoulder belts of the suspender type, said casing being connected to said shoulder belts.

5. A device according to claim 1, wherein said casing includes a portion arranged essentially in a horizontal plane, and depending portions passing through said axis.

6. A device according to claim 5, wherein the vehicle includes a seat, said structure being integral with said seat, the horizontal portion of the casing extending above said seat.

7. A device according to claim 1, wherein said inflatable members are of tubular form having a cross-section which tapers from a maximum section towards said two points of attachment to the structure which is integral with the vehicle, said tubular members being inflated by the introduction of a pressurized gas thereinto to cause expulsion of the strip from the casing so that the strip assumes said operative position.

8. A device according to claim 1, wherein said strip comprises a canvas member of determined length, including at least one of said inflatable members of tubular form extending substantially vertically with respect to the vehicle in the operative position of said strip, said at least one tubular member being inflated by introduction of a gas under pressure thereinto to cause expulsion of the strip from the casing at the time of impact so that the strip assumes said operative position.

9. A device according to claim 1, wherein said strip is made of a material which permits a considerable fraction of the energy of deformation produced by the loads due to impact to be dissipated so as not to be reconstituted in a mechanical form.

10. A device according to claim 1 comprising resilient means between said casing and said seat.

11. A device according to claim 1 wherein said casing is substantially of U-shape.

12. A device according to claim 11 wherein said casing is relatively thin and said strip in retracted position is confined within the casing.

* * * * *